(12) United States Patent
Rock (10) Patent No.: US 7,717,096 B2
(45) Date of Patent: May 18, 2010

(54) FUEL PROCESSOR APPARATUS AND METHOD

(75) Inventor: Kelly P. Rock, Henderson, NV (US)

(73) Assignee: LyteSyde, LLC, Miami Beach, FL (US)

( * ) Notice: Subject to any disclaimer, the term of this patent is extended or adjusted under 35 U.S.C. 154(b) by 874 days.

(21) Appl. No.: 11/337,291

(22) Filed: Jan. 23, 2006

(65) Prior Publication Data

US 2007/0169760 A1    Jul. 26, 2007

(51) Int. Cl.
*F02B 43/00*    (2006.01)
(52) U.S. Cl. ..................................... 123/527
(58) Field of Classification Search .............. 123/250, 123/251, 252, 255, 256, 263, 275, 280, 472; 60/737, 752
See application file for complete search history.

(56) References Cited

U.S. PATENT DOCUMENTS

| | | | |
|---|---|---|---|
| 634,242 A | 10/1899 | Lambert | |
| 751,292 A | 2/1904 | Johanson | |
| 860,259 A | 7/1907 | Smith | |
| 1,163,437 A | 12/1915 | Morison | |
| 1,233,557 A | 7/1917 | Curtis | |
| 1,309,719 A | 7/1919 | Curtis | |
| 1,313,521 A | 8/1919 | Connor et al. | |
| 1,419,702 A * | 6/1922 | Tartrais | 123/251 |
| 1,450,567 A * | 4/1923 | Tartrais | 123/251 |
| 1,451,063 A | 4/1923 | Anthony | |
| 1,471,220 A | 10/1923 | Tangye | |
| 1,626,085 A | 4/1927 | Henriot | |
| 2,071,717 A | 2/1937 | Winkle | |
| 2,172,170 A * | 9/1939 | Megroot | 123/276 |
| 2,242,274 A * | 5/1941 | Thysse | 123/261 |
| 2,599,422 A | 6/1952 | Yettaw | |
| 2,655,906 A * | 10/1953 | Udale | 123/263 |
| 3,286,997 A | 11/1966 | Ledbetter | |
| 3,336,017 A | 8/1967 | Kopa | |
| 3,395,899 A | 8/1968 | Kopa | |
| 3,414,242 A | 12/1968 | Bouteleux | |
| 3,506,589 A | 4/1970 | Hoffman et al. | |
| 3,515,676 A | 6/1970 | Hierta et al. | |
| 3,651,619 A | 3/1972 | Miura | |
| 3,667,221 A | 6/1972 | Taylor | |
| 3,733,060 A | 5/1973 | Merritt | |
| 3,761,065 A | 9/1973 | Rich et al. | |
| 3,778,038 A | 12/1973 | Eversole | |

(Continued)

FOREIGN PATENT DOCUMENTS

DE    1108666    6/1961

(Continued)

*Primary Examiner*—Stephen K Cronin
*Assistant Examiner*—Sizo B Vilakazi
(74) *Attorney, Agent, or Firm*—Holland & Hart (57) ABSTRACT

The present invention provides methods and apparatus for premixing fuel and oxidant for combustion. The methods and apparatus may include a two stage vortex, each stage accommodating different flow rate ranges. The vortex pulverizes fuel and optimally mixes the fuel with an oxidant prior to introduction into a combustion chamber. The premixing results in more complete combustion and, consequently, fuel efficiency may be increased and pollution may be decreased. The present invention also enables introduction of fuel and oxidant to an engine without creating any shockwaves in engine cylinders, which may otherwise occur with current fuel injection systems.

31 Claims, 5 Drawing Sheets

U.S. PATENT DOCUMENTS

| | | | |
|---|---|---|---|
| 3,811,278 A | 5/1974 | Taylor et al. | |
| 3,866,585 A | 2/1975 | Kopa | |
| 3,944,634 A | 3/1976 | Gerlach | |
| 3,946,552 A | 3/1976 | Weinstein et al. | |
| 3,972,182 A | 8/1976 | Salvi | |
| 4,030,283 A | 6/1977 | Sauthier et al. | |
| 4,087,862 A | 5/1978 | Tsien | |
| 4,159,881 A | 7/1979 | Gogneau | |
| 4,173,863 A | 11/1979 | Motoki et al. | |
| 4,178,134 A | 12/1979 | Babish et al. | |
| 4,182,280 A * | 1/1980 | Shekleton | 123/309 |
| 4,185,453 A | 1/1980 | Jaunin | |
| 4,215,535 A | 8/1980 | Lewis | |
| 4,217,313 A | 8/1980 | Dmitrievsky et al. | |
| 4,232,384 A | 11/1980 | Jaunin | |
| 4,245,338 A | 1/1981 | Sekiya et al. | |
| 4,255,410 A | 3/1981 | Spevack | |
| 4,261,048 A | 4/1981 | Motoki et al. | |
| 4,261,354 A | 4/1981 | Nelson | |
| 4,267,131 A | 5/1981 | Prudhon et al. | |
| 4,275,463 A | 6/1981 | Ishida | |
| 4,308,607 A | 12/1981 | Kopa | |
| 4,335,804 A | 6/1982 | Bardin et al. | |
| 4,421,079 A * | 12/1983 | Wade | 123/255 |
| 4,452,239 A | 6/1984 | Malem | |
| 4,464,314 A | 8/1984 | Suroviken et al. | |
| 4,515,734 A | 5/1985 | Rock et al. | |
| 4,568,500 A | 2/1986 | Rock et al. | |
| 4,635,857 A | 1/1987 | Hughes | |
| 4,726,686 A | 2/1988 | Wolf et al. | |
| 4,842,777 A | 6/1989 | Lamort | |
| 4,943,704 A | 7/1990 | Rabenau et al. | |
| 4,992,206 A | 2/1991 | Waldron | |
| 5,008,048 A | 4/1991 | Ryder | |
| 5,071,068 A | 12/1991 | Suniewski | |
| 5,169,302 A | 12/1992 | Keller | |
| 5,340,306 A | 8/1994 | Keller et al. | |
| 5,472,645 A | 12/1995 | Rock et al. | |
| 5,476,093 A | 12/1995 | Lankinen | |
| 5,487,378 A | 1/1996 | Robertson et al. | |
| 5,512,216 A | 4/1996 | Rock et al. | |
| 5,529,059 A | 6/1996 | Armstrong et al. | |
| 5,603,211 A * | 2/1997 | Graves | 60/776 |
| 5,672,187 A | 9/1997 | Rock et al. | |
| 5,687,710 A | 11/1997 | Ambrosio et al. | |
| 5,775,320 A | 7/1998 | Patton et al. | |
| 5,848,750 A | 12/1998 | Schwab | |
| 6,113,078 A | 9/2000 | Rock | |
| 6,234,459 B1 | 5/2001 | Rock | |
| 6,244,573 B1 | 6/2001 | Rock | |
| 6,557,519 B1 * | 5/2003 | Galbraith | 123/256 |
| 2004/0135006 A1 * | 7/2004 | Zur et al. | 239/490 |
| 2005/0082395 A1 * | 4/2005 | Gardega | 239/548 |
| 2005/0223710 A1 * | 10/2005 | Creighton et al. | 60/740 |
| 2007/0204839 A1 * | 9/2007 | Rock et al. | 123/526 |

FOREIGN PATENT DOCUMENTS

| | | |
|---|---|---|
| DE | 35 11 094 A1 | 10/1986 |
| DE | 94 02 811.7 | 7/1994 |
| DE | 44 27 466 A1 | 2/1996 |
| FR | 1156341 | 5/1958 |
| FR | 746984 | 6/1993 |
| GB | 2 296 037 | 6/1996 |
| SU | 1357032 | 12/1987 |
| WO | WO 85/03741 | 8/1985 |

* cited by examiner

FUEL PROCESSOR APPARATUS AND METHOD

BACKGROUND OF THE INVENTION

Many types of devices have been developed over the years for the purpose of converting liquids or aerosols into gas-phase fluids. Many such devices have been developed, for example, to prepare fuel for use in internal combustion engines. To optimize fuel oxidation within an engine's combustion chamber, the fuel/air mixture commonly must be further vaporized or homogenized to achieve a chemically-stoichiometric gas-phase mixture. Ideal fuel oxidation results in more complete combustion and lower pollution.

More specifically, relative to internal combustion engines, stoichiometricity is a condition where the amount of oxygen required to completely burn a given amount of fuel is supplied in a homogeneous mixture resulting in optimally correct combustion with no residues remaining from incomplete or inefficient oxidation. Ideally, the fuel should be completely vaporized, intermixed with air, and homogenized prior to entering the combustion chamber for proper oxidation. Non-vaporized fuel droplets generally do not ignite and combust completely in conventional internal and external combustion engines, which presents problems relating to fuel efficiency and pollution.

Incomplete or inefficient oxidation of fuel causes exhaustion of residues from the internal or external combustion engine as pollutants, such as unburned hydrocarbons, carbon monoxide, and aldehydes, with accompanying production of oxides of nitrogen. To meet emission standards, these residues must be dealt with, typically requiring further treatment in a catalytic converter or a scrubber. Such treatment of these residues results in additional fuel costs to operate the catalytic converter or scrubber. Accordingly, any reduction in residues resulting from incomplete combustion would be economically and environmentally beneficial.

Aside from the problems discussed above, a fuel-air mixture that is not completely vaporized and chemically stoichiometric causes the combustion engine to perform at less than peak efficiency. A smaller portion of the fuel's chemical energy is converted to mechanical energy when fuel is not completely combusted. Fuel energy is wasted and unnecessary pollution is created. Thus, by further breaking down and more completely vaporizing the fuel-air mixture, better fuel efficiency may be available.

Many attempts have been made to alleviate the above-described problems with respect to fuel vaporization and incomplete fuel combustion. In automobile engines, for example, direct fuel injection has almost universally replaced carburetion for fuel delivery. Fuel injectors spray a somewhat fine fuel mist directly into the cylinder of the engine and are controlled electronically. Currently, it is believed by most that the fuel injector spray allows the fuel and air to mix in the cylinders more efficiently than carburetion. Nevertheless, the fuel droplet size of a fuel injector spray is not optimal and there is little time for the fuel to mix with air prior to ignition. Even current fuel injector systems do not fully mix the fuel with the necessary air.

Moreover, it has been recently discovered that fuel injector sprays are accompanied by a shockwave in the fuel spray. The shockwave may prevent the fuel from fully mixing with air. The shockwave appears to limit fuel mass to certain areas of the piston, limiting the fuel droplets' access to air.

Other prior systems have also been developed in attempts to remedy the problems related to fuel vaporization and incomplete fuel combustion. For example, U.S. Pat. Nos. 4,515,734, 4,568,500, 5,512,216, 5,472,645, and 5,672,187 disclose various fuel vaporizing devices.

Nevertheless, prior vaporization devices fail to provide a configuration which is large enough to attain volumetric efficiencies at high RPM's, yet small enough to get high resolution responses at lower RPM's. Indeed, the prior devices have generally had to choose between volumetric efficiency at high RPM's and high resolution response at lower RPM's.

SUMMARY OF THE INVENTION

The principles described herein may address some of the above-described deficiencies and others. Specifically, some of the principles described herein relate to liquid processor apparatuses and methods.

One aspect provides a method comprising fueling an internal combustion engine. The fueling comprises creating a gaseous, homogenous premixture of fuel and oxidizer in a first pre-combustion vortex chamber and drawing the gaseous, homogenous premixture of fuel and oxidizer from the first pre-combustion vortex chamber into a combustion chamber. The method may further comprise preventing shockwaves in the combustion chamber. The shockwaves may be prevented in the combustion chamber upon the drawing of the gaseous, homogenous premixture of fuel and oxidizer from the first pre-combustion vortex chamber.

According to some aspects, creating a gaseous, homogenous premixture of fuel and oxidizer comprises creating an oxidizer vortex in the first pre-combustion vortex chamber, introducing fuel at an axis of the oxidizer vortex, and pulverizing the fuel and mixing the fuel with the oxidizer at an axial area of the first pre-combustion vortex chamber. Creating an oxidizer vortex may comprise introducing the oxidizer into the first pre-combustion vortex chamber at a non-tangential, non-radial angle through multiple fluid passageways. The method may include directing the gaseous, homogenous premixture evenly into a plurality of intake passages.

According to some aspects, creating a gaseous, homogenous premixture of fuel and oxidizer comprises creating an oxidizer vortex in the first pre-combustion vortex chamber, centering the oxidizer vortex on a intake tower, introducing fuel at an axis of the oxidizer vortex, and pulverizing and mixing the fuel with the oxidizer.

According to some aspects, creating a gaseous, homogenous premixture of fuel and oxidizer comprises providing a primary stage oxidizer introduction path, providing a secondary stage oxidizer introduction path, opening a valve in the secondary stage oxidizer introduction path upon reaching a predetermined oxidizer requirement threshold, creating an oxidizer vortex in a second pre-combustion vortex chamber with fluid flow from the secondary stage oxidizer introduction path, introducing fuel at an axis of the oxidizer vortex, and pulverizing and mixing the fuel with the oxidizer. When the predetermined oxidizer requirement threshold is met, a valve in the primary stage oxidizer introduction path remains fully open and a valve in the secondary stage oxidizer introduction path is also opened.

According to another aspect, creating a gaseous, homogenous premixture of fuel and oxidizer comprises creating an oxidizer vortex in a second pre-combustion vortex chamber, centering the oxidizer vortex on a diverging intake tower having a lip, introducing fuel at an axis of the oxidizer vortex, and pulverizing and mixing the fuel with the oxidizer. Fuel may be introduced both axially and radially through an injector at the axis of the oxidizer vortex.

According to another aspect, creating a gaseous, homogenous premixture of fuel and oxidizer comprises providing a primary stage oxidizer introduction path, providing a secondary stage oxidizer introduction path, mechanically opening a throttle valve in the second stage oxidizer introduction path according to fuel pedal position, creating an oxidizer vortex in a second pre-combustion vortex chamber with fluid flow from the secondary stage oxidizer introduction path, introducing fuel at an axis of the oxidizer vortex, and pulverizing the fuel and mixing the fuel with the oxidizer.

Another aspect comprises heating the gaseous, homogenous premixture of fuel and oxidizer with a water jacket.

One embodiment provides an apparatus comprising a pre-combustion fuel mixing device. The device further comprises a housing, a first pre-combustion vortex chamber enclosed by the housing, a plurality of angled passages leading into the first pre-combustion vortex chamber for creating a vortex, a first oxidant fluid flow path in fluid communication with the first pre-combustion vortex chamber, and a second pre-combustion vortex chamber enclosed by the housing and aligned axially with the first pre-combustion vortex chamber. The second pre-combustion vortex chamber may be larger than the first pre-combustion vortex chamber. The device may comprise a plurality of angled passages leading into the second pre-combustion vortex chamber for creating a vortex, and a second oxidant fluid flow path in fluid communication with the second pre-combustion vortex chamber. The angled passageways may be non-tangential and non-radial.

One embodiment of the device further comprises first and second diverging nozzles leading out of the first and second pre-combustion vortex chambers, respectively. The first diverging nozzle may comprise a plurality of lateral passages angled opposite of the plurality of angled passages leading into the first pre-combustion vortex chamber.

One embodiment comprises a conical pillar adjacent to an outlet of the first and second pre-combustion vortex chambers. The conical pillar may comprising a peripheral lip.

One embodiment of the device further comprises a valve disposed in the second oxidant fluid flow path, wherein the valve operates and opens a predetermined amount based on oxidant need. The device may comprise a throttle body housing a valve. The valve controls fluid flow through the second oxidant fluid flow path. The valve may be mechanically connected to a fuel pedal.

One embodiment of the device comprises a fuel injector aligned substantially axially with the first and second pre-combustion vortex chambers, the fuel injector comprising an axial flow channel, and a plurality of radial flow channels. The fuel injector may be disposed in a cylindrical cavity of the housing and in fluid communication with the first and second pre-combustion vortex chambers. The fuel injector may comprise a liquid flow channel and an atmospheric vent in fluid communication with liquid flow channel.

According to one embodiment, the first pre-combustion vortex chamber is defined by a wheel, the wheel having the angled passages, wherein the angles of the angled passages are non-tangential, and non-radial. The angles of the angled passages may be at least about thirty degrees from tangent.

According to one embodiment, the first and second pre-combustion vortex chambers are defined by first and second wheels, the wheels having the angled passages. The second wheel comprises a radius at least twice as large as the first wheel. The angles of the angled passages may range between ten and seventy degrees from tangent.

Another embodiment comprises an internal combustion engine premixing device. The device comprises a two stage vortex chamber, and the first stage is in fluid communication with a first oxidation source. A second stage is in fluid communication with a separate, second oxidation source. The device comprises a fuel injector arranged axially internal of the first and second stages. The first stage, the second stage, and the fuel injector may be substantially coaxial. In one embodiment the first stage may comprises a high vacuum, low flow rate vortex chamber, and the second stage may comprise a larger volume than the first stage and include a low vacuum, high flow rate vortex chamber. A "low" flow rate refers to a mass flow rate of less than approximately 262 lbm/hr. A "high" flow rate refers to a mass flow rate of more than approximately 262 lbm/hr. The first stage may comprise a first wheel having angled passages for creating a vortex, and the second stage may comprises a second wheel that is larger than the first wheel for creating a vortex.

Some embodiments of the apparatus comprise a first nozzle disposed at an outlet to the first stage, the first nozzle comprising fluid passages arranged both in a vortex direction and in a direction opposite of the vortex direction, for directing fluids pulverized by the first stage in a generally non-rotational flow.

Some embodiments comprise a diverging nozzle at an outlet of the second stage. Some embodiments include a pillar arranged adjacent to the internal combustion engine premixing device for centering a vortex created in the first or second stages. According to some embodiments, the fuel injector comprises axial and radial ports for injecting fuel into the first and second stages. According to some embodiments, the device is infinitely adjustable between oxidant fluid flow directed to the first and second stages. According to some embodiments, the first oxidation source is open to the first stage until a predetermined flow rate is reached, and the second oxidation source is opened when the predetermined flow rate is reached. Some embodiments of the device further comprise a water jacket disposed about the two stage vortex chamber.

Another aspect provides a method of mixing fuel with an oxidant. The method comprises axially introducing fuel into an oxidant vortex, and atomizing the fuel and mixing the fuel with the oxidant vortex.

Another aspect provides a method comprising fueling an automobile. The method includes premixing fuel with an oxidant and drawing the premixed fuel and oxidant into a combustion chamber of the automobile by vacuum without forcing additional fuel into the combustion chamber. The premixing comprising introducing fuel into an oxidant vortex to create premixed fuel and oxidant.

According to one aspect, the premixing comprises providing first and second vortex chambers in series. The oxidant enters the first and second vortex chambers at an angle and creates the oxidant vortex. The premixing may also comprise providing a fuel injector and injecting fuel axially, such that the injecting injects fuel axially into the oxidant vortex created by either one of the first or second vortex chambers.

According to some aspects, the premixing comprises centering and holding the oxidant vortex. According to some aspects, the drawing comprises evenly distributing the premixed fuel and oxidant into a manifold.

One embodiment provides an apparatus comprising a fuel/air mixer. The fuel/air mixer comprises a housing and an axially aligned vortex assembly. The vortex assembly comprises a hat comprising a cylindrical cavity. The vortex assembly also comprises a fuel injector disposed in the cylindrical cavity, the fuel injector comprising an axial fuel flow path and a plurality of radial fuel flow paths. The vortex assembly also comprises an annulus between the cylindrical cavity and the injector at the radial fuel flow paths. The vortex assembly also comprises a first vortex wheel arranged adjacent to the hat, the first vortex wheel comprising a plurality of angled passages spaced around a periphery of the first vortex wheel, the angled passages comprising an angle ranging between approximately five and fifty degrees from tangent. The vortex assembly may further comprise a first output nozzle comprising a rim, the rim contacting the first vortex wheel, the first output nozzle further comprising a primary central axis hole open to the center of the first vortex, and a plurality of angled passages extending through the nozzle at different angles, the different angles directing flow both clockwise and counterclockwise. The vortex assembly may comprise a restrictor plate spaced from the first output nozzle and a second vortex wheel in contact with the restrictor plate. The second vortex wheel is larger than the first vortex wheel, and the second vortex wheel comprises a plurality of angled passages spaced around a periphery of the second vortex wheel. The angled passages comprise an angle ranging between approximately five and fifty degrees from tangent. The vortex assembly may include a second output nozzle adjacent to the second vortex wheel and leading out of the housing.

According to some embodiments, the apparatus may further comprise a first oxidizer passageway disposed in the housing and in fluid communication with the first vortex wheel, the first oxidizer passageway comprising a first adjustable valve. The apparatus may also include a second oxidizer passageway disposed in the housing and in fluid communication with the second vortex wheel. According to some embodiments, flow through the first or second oxidizer passageways is mutually exclusive.

According to some embodiments, the apparatus further comprises a first oxidizer passageway disposed in the housing and in fluid communication with the first vortex wheel, the first oxidizer passageway comprising a first electronically adjustable valve. The apparatus may also include a second oxidizer passageway disposed in the housing and in fluid communication with the second vortex wheel, the second oxidizer passageway comprising a mechanically operated butterfly valve operatively connected to a fuel pedal.

Another aspect provides a method of fueling an automobile, the method comprising premixing fuel with air and automatically varying an air-to-fuel ratio based on engine speed and load. In one embodiment, the premixing comprises introducing fuel into an air vortex to create a premixture of fuel and air. In one embodiment automatically varying the air-to-fuel ratio comprises varying the air-to-fuel ratio according to parameters of a lookup table. In one embodiment, automatically varying the air-to-fuel ratio comprises varying the air-to-fuel ratio according to parameters of a lookup table having engine speed and manifold absolute pressure as table variables. In one embodiment, automatically varying the air-to-fuel ratio comprises varying the air-to-fuel ratio to between approximately 0.97 and 1.3 of a stoichiometric ratio. That is to say, varying the air-to-fuel ratio to a ratio between approximately 14.2:1 and 19:1. In some embodiments, the air-to-fuel ratio is varied between 12.0:1 and 21:1 or between 13.0:1 and 20:1. In one embodiment, automatically varying the air-to-fuel ratio comprises setting the air-to-fuel ratio below a stoichiometric ratio at an engine intake manifold absolute pressure above approximately 80 $KPA_{abs}$. In one embodiment automatically varying the air-to-fuel ratio comprises setting the air-to-fuel ratio above a stoichiometric ratio at an engine intake manifold absolute pressure below approximately 80 $KPA_{abs}$. In one embodiment, automatically varying the air-to-fuel ratio comprises setting the air-to-fuel ratio approximately 1.12 times greater than a stoichiometric ratio at an engine intake manifold absolute pressure of approximately 60 $KPA_{abs}$. In one embodiment, automatically varying the air-to-fuel ratio comprises setting the air-to-fuel ratio approximately 1.21 times greater than a stoichiometric ratio at an engine intake manifold absolute pressure of approximately 50 $KPA_{abs}$. In one embodiment, automatically varying the air-to-fuel ratio comprises setting the air-to-fuel ratio approximately 1.27 times greater than a stoichiometric ratio at an intake manifold absolute pressure of approximately 42 $KPA_{abs}$ or less and engines speeds of 1000 RPM or less. In one embodiment, automatically varying the air-to-fuel ratio comprises setting the air-to-fuel ratio approximately 1.3 times greater than a stoichiometric ratio at an intake manifold absolute pressure of approximately 42 $KPA_{abs}$ or less and engines speeds greater than 1000 RPM.

BRIEF DESCRIPTION OF THE DRAWINGS

The accompanying drawings illustrate certain embodiments discussed below and are a part of the specification.

Throughout the drawings, identical reference characters and descriptions indicate similar, but not necessarily identical elements.

DETAILED DESCRIPTION

Illustrative embodiments and aspects are described below. It will of course be appreciated that in the development of any such actual embodiment, numerous implementation-specific decisions must be made to achieve the developers' specific goals, such as compliance with system-related and business-related constraints, that will vary from one implementation to another. Moreover, it will be appreciated that such a development effort might be complex and time-consuming, but would nevertheless be a routine undertaking for those of ordinary skill in the art having the benefit of this disclosure.

As used throughout the specification and claims, the term "pre-combustion chamber" refers to an area that is not a combustion area. The words "including" and "having," as used in the specification, including the claims, have the same meaning as the word "comprising."

Figure 1:
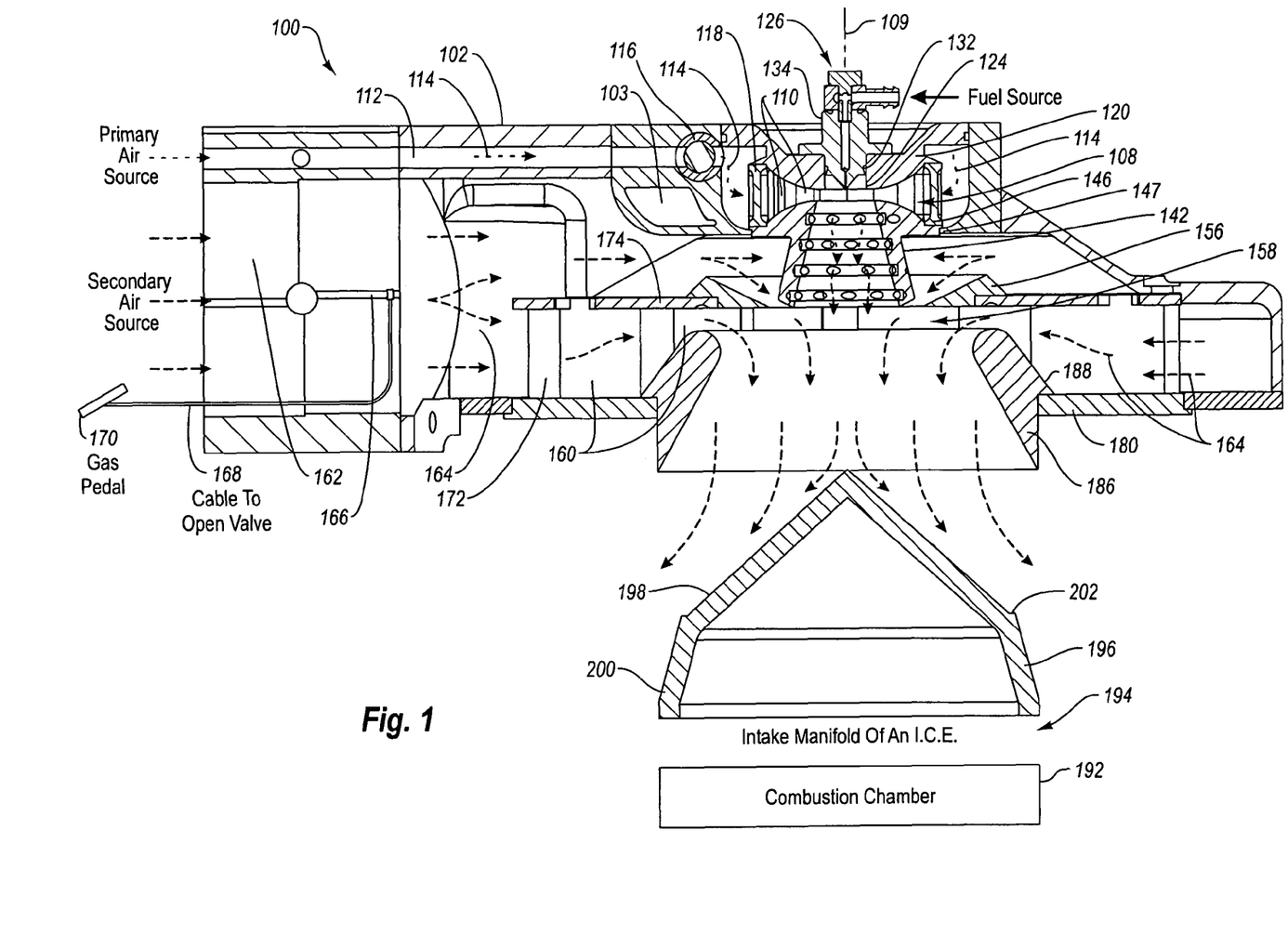
FIG. 1 is a cross sectional view of a mixing apparatus in relation to an intake manifold according to one embodiment.

Turning now to the figures, and in particular to FIGS. 1-5, one embodiment of a mixing apparatus is shown. The mixing apparatus may comprise, for example, a pre-combustion fuel mixing device 100. The pre-combustion fuel mixing device 100 may provide a premixed supply of fuel and oxidant to an internal combustion engine or other device. FIG. 1 illustrates the pre-combustion fuel mixing device 100 fully assembled and in cross-section.

Figure 5:
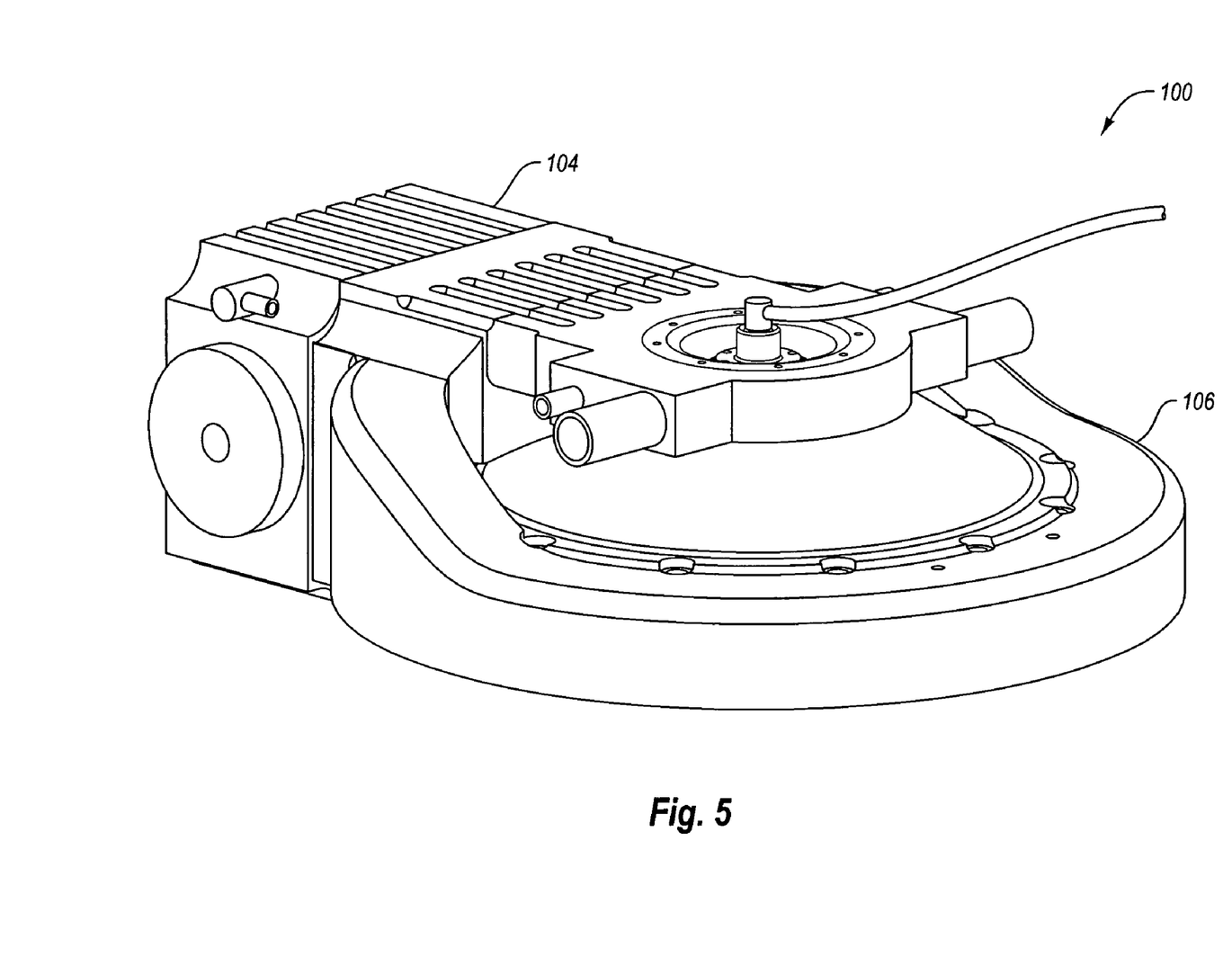
FIG. 5 is a perspective view of the mixing apparatus of FIG. 1.

The pre-combustion fuel mixing device 100 comprises a housing 102. The housing 102 is a generally rigid structure that may be made of metal, ceramic, composite, plastic, or other materials. The housing 102 encloses a number of internal components which are described below. The housing 102 is shown in perspective view in FIG. 5. The housing 102 may comprise any size or shape, although as shown in FIG. 5, some embodiments of the housing include an oxidant inlet section 104 and a vortex section 106. The oxidant inlet section 104 may comprise a throttle body as shown in FIG. 5.

The housing 102 encloses a first pre-combustion vortex chamber or first stage 108. The first pre-combustion vortex chamber 108 comprises a first axis 109. A plurality of angled passages 110 lead into the first pre-combustion vortex chamber 108. The plurality of angled passages 110 facilitate the creation of a vortex or tornado in the first pre-combustion vortex chamber 108. A first oxidant flow introduction path 112 disposed in the housing 102 is in fluid communication with the first pre-combustion vortex chamber 108. The first oxidant flow path 112 provides a primary air or oxidant source to the first pre-combustion vortex chamber 108. A set of arrows 114 indicates the direction of the flow of air or other oxidant through the first oxidant flow introduction path 112 into the first pre-combustion vortex chamber 108. A first valve 116 disposed in the first oxidant flow path 112 may comprise an electronically controlled valve to regulate the flow or flow rate of air into the first pre-combustion vortex chamber 108 based on need.

The plurality of angled passages 110 leading into the first pre-combustion vortex chamber 108 may comprise slots formed in and spaced around a periphery of a wheel such as first vortex wheel 118. The first vortex wheel 118 is most clearly shown in perspective view in FIG. 2. The first vortex wheel 118 may comprise a generally rigid structure and may be made of metal, plastic, ceramic, composite, or other materials. The first vortex wheel 118 is coaxial with first axis 109. The angled passages 110 of the first vortex wheel 118 may be non-tangential, and non-radial. That is to say, the angled passages 110 comprise an angle from tangent greater than zero degrees and less than ninety degrees (ninety degrees is perfectly radial or centered). The angled passages 110 may be angled between about ten and seventy degrees. The angled passages 110 may range between about five and fifty degrees. The angled passages 110 may be at least about thirty degrees from tangent. Thus, the angled passages 110 tend to facilitate creation of a vortex in the first pre-combustion vortex chamber 108 as air is introduced therein. The vortex tends to be spaced internal of the first wheel 118, as the angled passages 110 are non-tangential.

According to one embodiment, the first vortex wheel 118 is adjacent to and in contact with a hat 120. The hat 120 is generally circular and attached to the housing 102. The hat 120 may be semi-spherical or dish shaped and extend partially into the center of the first vortex wheel 118. For example, a spherical portion 122 of the hat 120 may extend approximately half way into the center of the first vortex wheel 118. The hat 120 may comprise metal, plastic, ceramic, composite, or other material. As shown in FIGS. 1-5, the hat 120 may be coaxial with the first vortex wheel 118. The hat 120 also includes a central hole 124 that may define a cylindrical cavity. The central hole 124 of the hat 120 is receptive of an injector, such as fuel injector 126.

According to one embodiment, the fuel injector 126 may be coaxial with the first wheel and the hat 120. The fuel injector 126 may include a flange 128 that connects the fuel injector 126 to the hat 120 and creates a seal. However, a head 130 of the fuel injector 126 inserts into the central hole 124 of the hat 120. The diameter of the central hole 124 and the diameter of the head 130 of the fuel injector 126 are sized to leave an annulus 132 between an inner surface of the central hole 124 and an outer surface of the head 130. The fuel injector 126 also includes a tail 134 that may extend outside of the housing 102. The fuel injector 126 is in fluid communication with a fuel source.

According to one embodiment, the fuel injector 126 may include an inlet 135 and multiple fluid or liquid ports. For example, according to the embodiment of FIGS. 4A-4B, the fuel injector 126 includes an axial flow channel 136 and a plurality of radial flow channels 138 each in fluid communication with the inlet 135. According to the embodiment of FIGS. 4A-4B, there are four equally spaced radial flow channels 138. In addition, the fuel injector 126 may include one or more pressure equalization vents, such as atmospheric vents 140. The atmospheric vents 140 may be open to atmosphere, and there may be one atmospheric vent 140 in fluid communication with each of the radial flow channels 138. Therefore, according to FIGS. 4A-4B, there are four atmospheric vents 140. The atmospheric vents 140 prevent a pressure differential at the radial flow channels 138 and thus the axial flow channel 136.

Returning to FIGS. 1-2, according to one embodiment the annulus 132 may provide a gap large enough to eliminate any flow restriction of fluids exiting the head 130 radially through the radial flow channels 138. That is to say, the size or diameter of the radial flow channels 138 tends to limit flow capacity rather than the annulus 132. The fuel injector 126 introduces fuel to the first pre-combustion vortex chamber 108 at the axis 109, rather than through the angled passages 110.

According to the embodiment of FIGS. 1-5, the first vortex wheel 118 is arranged adjacent to and may contact a first output nozzle 142. The first output nozzle 142 is arranged coaxially with the first vortex wheel 118 and may comprise a diverging nozzle made of metal, plastic, ceramic, composite, or other material. The first output nozzle 142 may include a hemispherical hat 144 that extends partially into the first vortex wheel 118. A lip 146 around the hemispherical hat 144 may provide a contact or resting surface for the first vortex wheel. The lip 146 may sit on an internal protrusion 147 of the housing 102. Accordingly, the first output nozzle 142 may be suspended within the housing 102 as shown in FIG. 1.

According to one embodiment, the first output nozzle 142 comprises a central hole 148 that is open to the first pre-combustion vortex chamber 108. In addition, the first output nozzle 142 includes a plurality of small angled passages extending laterally therethough at different angles. For example, according to the embodiment of FIG. 2, the first output nozzle 142 includes a first set of angled passages 150 in the hemispherical hat 144 and a second set of angled passages 150, 152 in a conical tail portion 154. The first and second sets of angled passages 152 may include passages directing fluid in both clockwise and counter-clockwise directions. There may be any number of passages in the clockwise and counter-clockwise directions, and there may be a substantially equal number in each direction to create a non-vortical or non-rotational flow through the first output nozzle 142.

According to one embodiment, the first output nozzle 142 leads to a second pre-combustion vortex chamber or second stage 158. Together with the first pre-combustion vortex chamber 108, the second pre-combustion vortex chamber forms a two stage vortex chamber. The second pre-combustion vortex chamber 158 may be coaxial with the first axis 109. The second pre-combustion vortex chamber 158 is larger than the first pre-combustion vortex chamber 108 and may comprise a radius at least twice as large as the radius of the first pre-combustion vortex chamber 108. A second plurality of angled passages 160 lead into the second pre-combustion vortex chamber 158. The second plurality of angled passages 160 facilitate the creation of a vortex or tornado in the second pre-combustion vortex chamber 158. A second or secondary oxidant flow introduction path 162 disposed in the housing 102 is in fluid communication with the second pre-combustion vortex chamber 158. The secondary oxidant flow introduction path 162 is larger than the first oxidant flow introduction path 112. The secondary oxidant flow path 162 provides air or another oxidant source to the second pre-combustion vortex chamber 158. Arrows 164 indicate the direction of the flow of air or other oxidant into the second pre-combustion vortex chamber 158 and through the second set of angled passages 152 in the conical tail portion 154 of the first output nozzle 142. A valve such as a second or butterfly valve 166 disposed in the second oxidant flow path 162 may comprise an electronically or mechanically controlled valve to regulate the flow rate of air into the second pre-combustion vortex chamber 158 based on need. The larger secondary oxidant flow path 162 and second pre-combustion vortex chamber 158 accommodate high fluid flow rates as needed. If mechanically controlled, the butterfly valve 166 may be connected by a cable 168 to a pedal or throttle such as a gas pedal 170 of an automobile.

Figure 2:
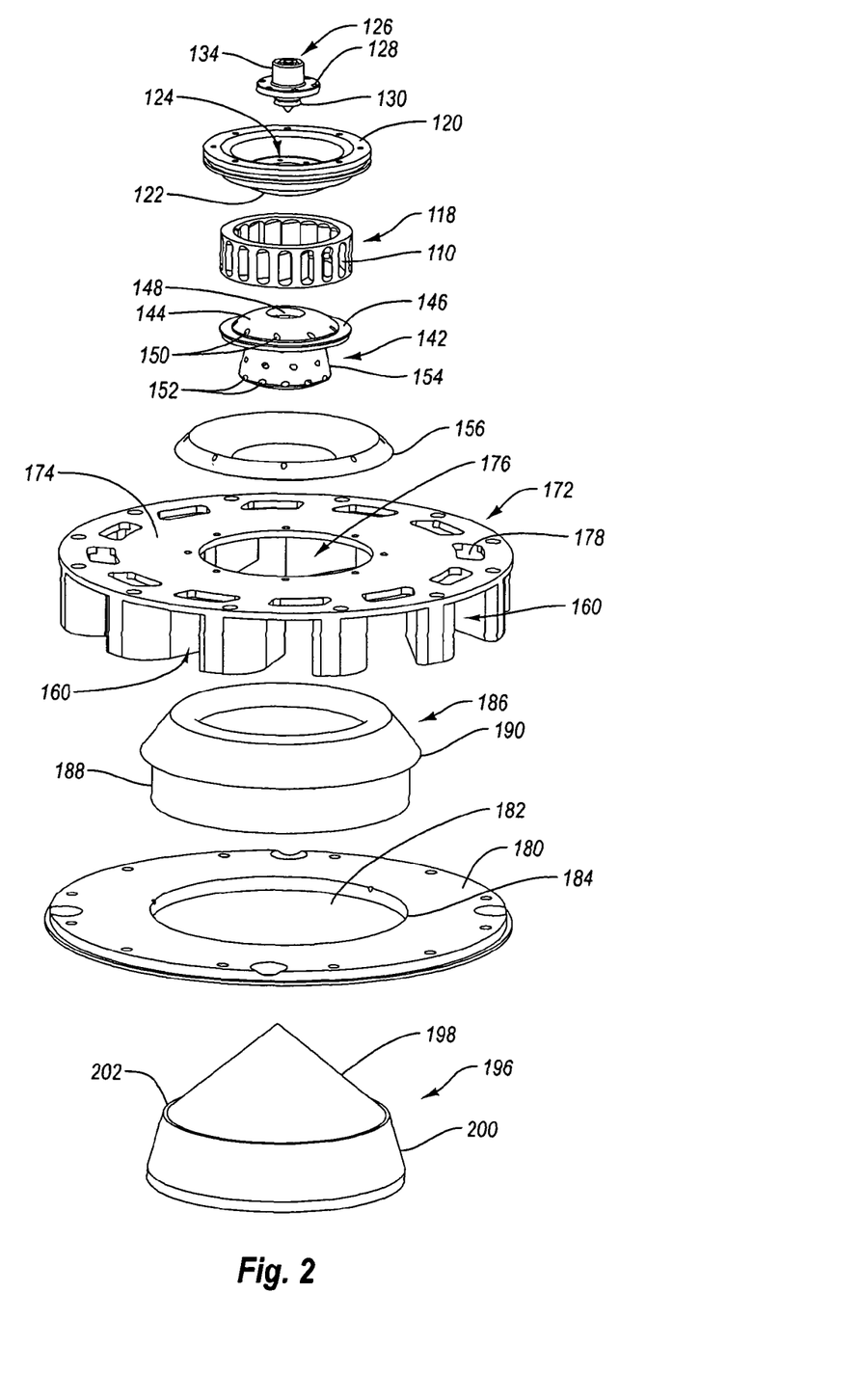
FIG. 2 is a perspective assembly view of a set of vortex creating components shown in FIG. 1, prior to enclosure within a housing.
Figure 3:
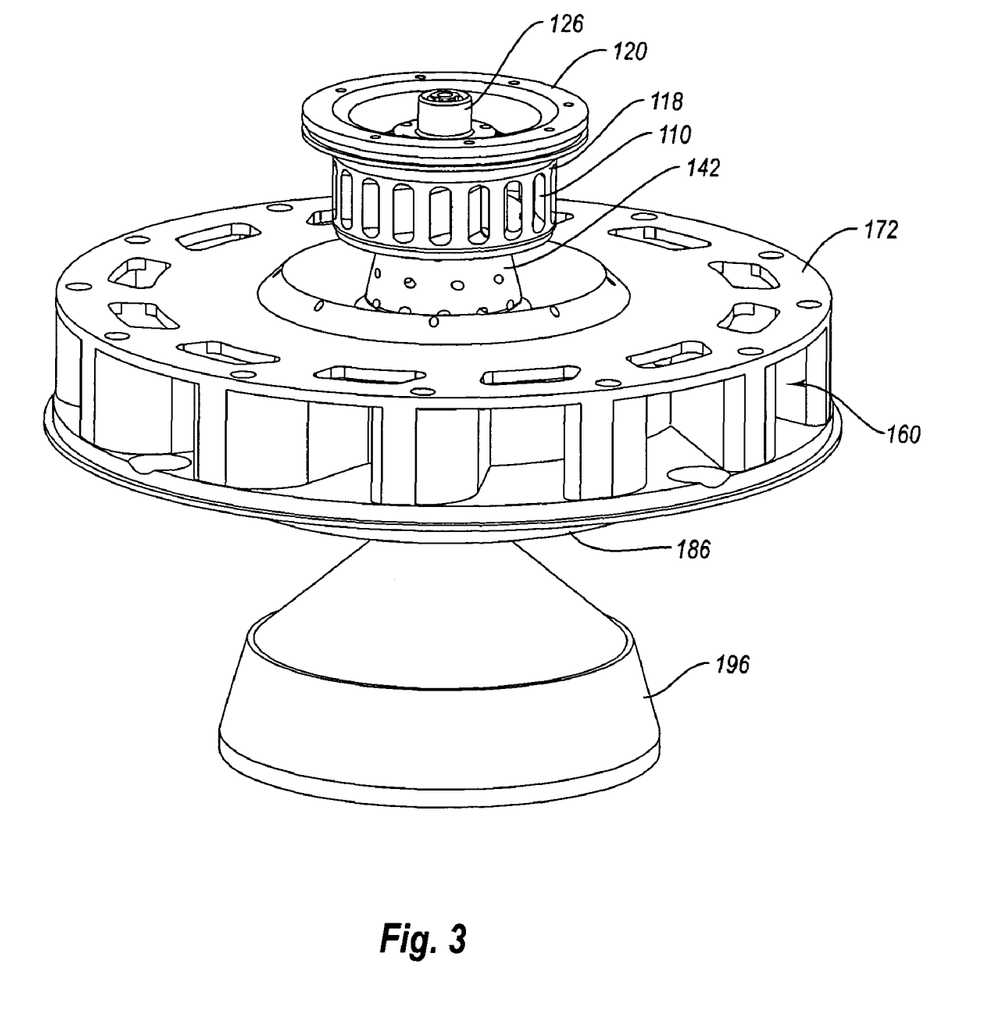
FIG. 3 is a perspective view of the components shown in FIG. 2 following assembly.
Figure 4A:
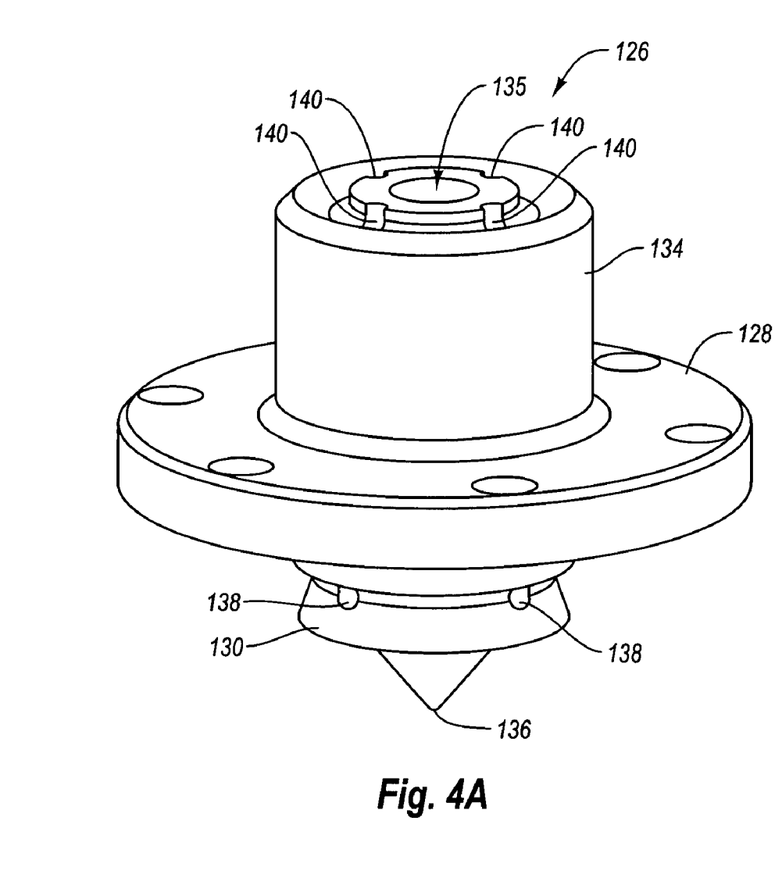
FIG. 4A is a perspective view of an injection nozzle used in the mixing apparatus according to one embodiment.
Figure 4B:
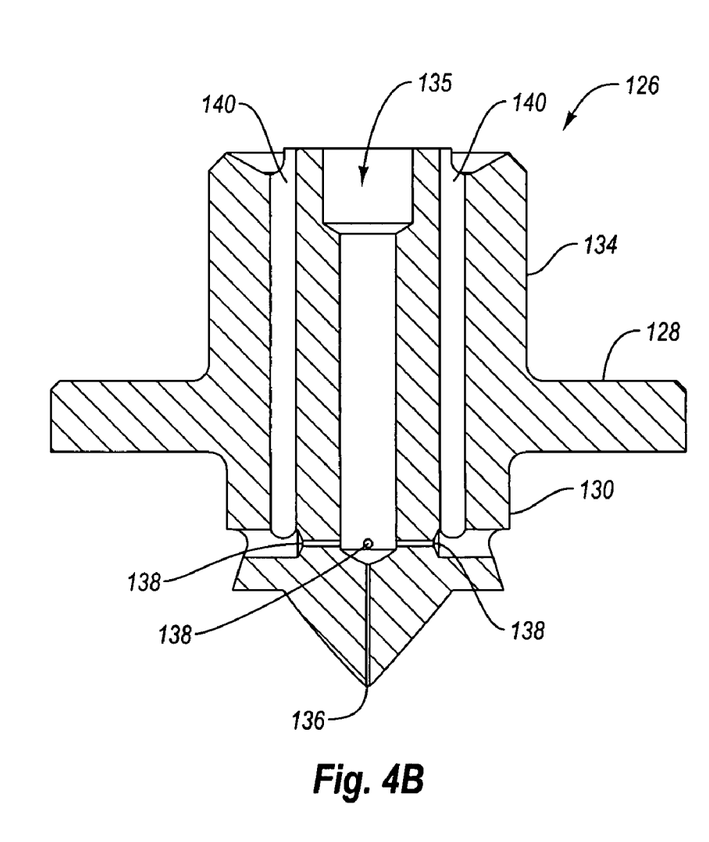
FIG. 4B is a cross sectional view of the injection nozzle shown in FIG. 4A.

According to one embodiment, the plurality of angled passages 160 leading into the second pre-combustion vortex chamber 158 may comprise slots formed in and spaced around a periphery of another wheel such as second vortex wheel 172. The second vortex wheel 172 is most clearly shown in perspective view in FIG. 2. The second vortex wheel 172 may be larger—and according to some embodiments at least twice as large—as the first vortex wheel 118. The second vortex wheel 172 may comprise a generally rigid structure and may be made of metal, plastic, ceramic, composite, or other materials. The second vortex wheel 172 is coaxial with the first axis 109. The angled passages 160 of the second vortex wheel 172 may be non-tangential, and non-radial. The angled passages 160 comprise an angle from tangent greater than zero degrees and less than ninety degrees. The angled passages 160 may be angled between about ten and seventy degrees. The angled passages 160 may range between about five and fifty degrees. The angled passages 160 may be at least about thirty degrees from tangent. Thus, the angled passages 160 tend to facilitate creation of a vortex in the second pre-combustion vortex chamber 158 as air is introduced therein. The vortex tends to be spaced internal of the second wheel 172, as the angled passages 160 are non-tangential. The second vortex wheel 172 may include a lid 174 with a central hole 176 open to the first output nozzle 142, and a plurality of smaller holes 178. A restrictor plate 156 may be disposed in the central hole 176. The restrictor plate 156 may be curved or funneled as shown in the embodiment of FIG. 2.

According to one embodiment, the second vortex wheel 172 may rest on and may be attached to a closing plate 180. The closing plate 180 may be substantially flush with the housing 102 and includes a central hole 182 coaxial with the first axis 109. An inner ring 184 of the closing plate 180 may support a second or final outlet nozzle 186. The second outlet nozzle 186 and the closing plate 180 may comprise generally rigid structures and may be made of metal, plastic, ceramic, composite, or other materials. The second outlet nozzle 186 may comprise an interior diverging nozzle as best shown in FIG. 1. The second outlet nozzle 186 may include a generally cylindrical outer portion 188 and an outer lip 190 having a diameter greater than the generally cylindrical portion 188. The generally cylindrical outer portion 188 is sized to slide into the central hole 182 of the closing plate 180, but the outer lip 190 limits the insertion depth. The outer lip 190 comprises a diameter that is larger than the diameter of the central hole 182. According to one embodiment, the second outlet nozzle 186 straddles the closing plate 180 and extends partially into the interior of the second vortex wheel 172. According to one embodiment, the first and second vortex chambers and one or more of the other components described above may comprise an axially aligned vortex assembly.

According to one embodiment, the second outlet nozzle 186 leads out of the pre-combustion fuel mixing device 100 and may provide a premixture of gaseous, homogenous fuel and oxidizer to a combustion chamber 192. According to one embodiment, the pre-combustion fuel mixing device 100 is arranged adjacent to an intake manifold 194 that distributes the premixture of gaseous, homogenous fuel and oxidizer to several combustion chambers, such as internal combustion engine cylinders. Further, some embodiments include an intake pillar, such as a conical pillar 196, at the second outlet nozzle 186. The conical pillar 196 may be part of the intake manifold 194. However, according to some embodiments the conical pillar 196 may also be part of and attached to the pre-combustion fuel mixing device 100.

According to one embodiment, the conical pillar 196 is coaxial with the first axis 109. The conical pillar 196 may be made of metal, plastic, ceramic, composite, or other materials. The conical pillar 196 may tend to center or hold the vortexes formed in either the first or second pre-combustion vortex chambers 108, 158. Centering or holding the vortexes formed in either the first or second pre-combustion vortex chambers 108, 158 may aid in the pulverizing and mixing of the fuel into the premixture of gaseous, homogenous fuel and oxidizer. Centering the vortexes with the conical pillar 196 also tends to evenly distribute the premixture of gaseous, homogenous fuel and oxidizer into each of the various intake passageways of the intake manifold 194 leading to combustion chambers.

The conical pillar 196 may take on many forms. According to one embodiment, the conical pillar 196 comprises at least two different slopes. For example, a first conic surface 198 may have a first slope, and a second conic surface 200 may have a second slope steeper than the first slope. However, the conical pillar 196 may have a single slope according to one embodiment, and the second conic surface 200 may be replaced by a cylindrical surface according to some embodiments. As shown in the embodiment of FIGS. 1-5, the conical pillar 196 may comprise a peripheral lip 202 between the first and second conic surfaces 198, 200. The peripheral lip 202 may provide a collection area for any liquids that fall out of the premixture of gaseous, homogenous fuel and oxidizer created by the vortexes. As the flow of gaseous, homogenous fuel and oxidizer passes by the conical pillar 196, it tends to "drag" with it some of the liquids that collect at the peripheral lip 202.

According to one embodiment, the housing 102 may define a heat exchanger such as a water cooling jacket 103. The water cooling jacket 103 is in fluid communication with the cooling system of the engine and arranged around the first pre-combustion vortex chamber 108. The water cooling jacket 103 comprises an internal fluid passageway of the housing 102 and may heat oxidant flowing through the first and second oxidant flow introduction paths 112, 162 and/or the premixture of gaseous, homogenous fuel and oxidizer. The water cooling jacket 103 primarily cools the engine and operates in steady state conditions at approximately 190-212° F.

According to some aspects, the pre-combustion fuel mixing device 100 facilitates methods of mixing fuel with oxidant. For example, some aspects provide methods of fueling an engine such as an internal combustion engine, or methods of fueling an automobile. According to one aspect, fuel is mixed with an oxidant by axially introducing fuel into an oxidant vortex. For example, fuel may be axially introduced into either or both of the first and second pre-combustion vortex chambers 108, 158 via the fuel injector 126. Engine action creates a vacuum to draw air or other oxidant into one or both of the first and second pre-combustion vortex chambers 108, 158. The arrangement of the angled passages 110, 160 into each of the first and second pre-combustion vortex chambers 108, 158 creates a vortex when air is drawn therein. Moreover, according to one embodiment, vortexes created in either of the first and second pre-combustion vortex chambers 108, 158 are held and centered by naturally attaching to the conical pillar 196.

According to one embodiment, fuel is introduced axially (as opposed to tangentially or radially or laterally through circumferential slots such as the angled passages 110, 160) into the first and second pre-combustion vortex chambers 108, 158 to pulverize or atomize the fuel and create a gaseous, homogenous premixture of fuel and oxidizer. According to one embodiment, the pulverizing action is in an axial area spaced from the outer walls (at the angled passages 110, 160).

According to some embodiments, the gaseous, homogenous premixture of fuel and oxidizer is drawn from the first and/or second vortex chambers 108, 158 into the combustion chamber 192. According to one embodiment, neither the fuel nor oxidant is injected or injected under pressure into the combustion chamber 192. Instead, according to one embodiment, the premixture of fuel and oxidant is drawn into the combustion chamber 192 by vacuum (created, for example, by the reciprocation of a piston in a cylinder). Therefore, shockwaves that accompany typical fuel injection systems may be prevented in the combustion chamber 192. Further, the premixture of fuel and oxidant drawn into the combustion chamber 192 by vacuum may be more likely to evenly distribute within the combustion chamber 192 to fill the vacuum.

According to some embodiments, the first chamber 108 operates either alone or in combination with the second vortex chamber 158. For example, the butterfly valve 166 disposed in the second oxidant flow path 162 may be normally closed (but may allow a small amount of oxidant to leach thereby and enter, for example, the angled passages 152 of the first outlet nozzle 142). The valve 116 and the fuel injector 126 may be operated in electronic or mechanical coordination to provide a combustible ratio of fuel and oxidant based on need and/or engine speed. According to one embodiment, the first vortex chamber 108 comprises a high vacuum, low flow rate vortex chamber, and therefore the valve 116 is normally open when an engine needs a low flow rate of gaseous, homogenous fuel and oxidant. The valve 116 may be infinitely adjustable to provide an appropriate amount of oxidant for introduced fuel.

According to one embodiment, when combustion needs require a higher flow rate of gaseous, homogenous premixture of fuel and oxidizer than the first oxidant flow path 112 can reasonably provide, the butterfly valve 166 may also open. For example, in one embodiment, the first oxidant flow path 112 can provide air mass flow rates ranging between approximately 0 and 262 lbm/hr. The second oxidant flow path 162 can provide higher flow rates of oxidant into the second pre-combustion vortex chamber 158 than the first oxidant flow path 112 can provide to the first pre-combustion vortex chamber 108. Therefore, the second pre-combustion vortex chamber 158 may comprise a low vacuum, high flow rate vortex chamber. In one embodiment, the second oxidant flow path 162 can provide air mass flow rates ranging between approximately 0 and 1400 lbm/hr. In other embodiments, the second oxidant flow path 162 can provide air mass flow rates greater than 1400 lbm/hr. The butterfly valve 166 may also be infinitely adjustable to provide an appropriate amount of oxidant for introduced fuel. In one embodiment, the butterfly valve 166 is only opened after the valve 116 is fully open. Because the first and second pre-combustion vortex chambers 108, 158 are aligned axially in some embodiments, the same fuel injector 126 may provide fuel to both chambers. It will be understood by one of ordinary skill in the art having the benefit of this disclosure, however, that the ranges of flow rates mentioned above are exemplary in nature and the flow paths 112, 162 may be altered to provide other flow ranges as well.

According to one embodiment, flow through the first and second oxidant flow paths 112, 162 is additive. That is to say, when the valve 116 is fully open and additional flow capacity is necessary, the butterfly valve 166 is opened as well. For example, in one embodiment, the valve 116 may adjust flow rate between approximately 0 and 262 lbm/hr, and the butterfly valve 166 may be opened to increase flow rate capacity from 262 lbm/hr to 1400 lbm/hr or more. According to one embodiment, the butterfly valve 166 is mechanically connected to the gas pedal 170 of an automobile such that when the gas pedal is depressed to a predetermined level or a predetermined oxidizer requirement threshold is met, the valve 116 is fully open and the butterfly valve 166 opens. Nevertheless, according to one embodiment, the valve 116 and the butterfly valve 166 may each be only partially open.

According to one aspect, the pre-combustion fuel mixing device 100 is in operation with the valve 116 in the first oxidant flow introduction path or source 112 open. Oxidant enters the first pre-combustion vortex chamber 108 and creates a vortex. Fuel is introduced into the center of the vortex of the first pre-combustion vortex chamber 108, which pulverizes the fuel and creates the gaseous, homogenous premixture of fuel and oxidizer. The gaseous, homogenous premixture of fuel and oxidizer passes through the first outlet nozzle 142, through the second pre-combustion vortex chamber 108, and out the second outlet nozzle 186. According to some embodiments, which may include the conical pillar 196, the flow of gaseous, homogenous premixture of fuel and oxidizer is evenly distributed though the intake manifold 194 and drawn under vacuum pressure into one or more combustion chambers 192.

According to one aspect, the pre-combustion fuel mixing device 100 is in operation with the butterfly valve 166 in the second oxidant flow introduction path or source 162 open. Oxidant enters the second pre-combustion vortex chamber 158 and creates a vortex. Fuel is introduced into the center of the vortex of the second pre-combustion vortex chamber 158, which pulverizes the fuel and creates the gaseous, homogenous premixture of fuel and oxidizer. The gaseous, homogenous premixture of fuel and oxidizer passes through the second outlet nozzle 186 and is evenly distributed though the intake manifold 194 and drawn under vacuum pressure into one or more combustion chambers 192.

According to one aspect, the pre-combustion fuel mixing device 100 operates to fuel an automobile and varies an air-to-fuel ratio. For example, in one embodiment, the valves 116, 166 operate automatically (either electronically programmed or according to throttle position with a mechanical control) to vary air-to-fuel ratio based on engine speed and the load on the engine. In one embodiment, intake manifold absolute pressure is monitored, which is representative of the load on the engine.

In one embodiment, the automatic variation of the air-to-fuel ratio may follow parameters of a lookup table or a formula. Under some conditions, it is believed that a stoichiometric air-to-fuel ratio is ideal. However, some engine conditions may result in better fuel efficiency, more power, or other desired performance characteristics, at non-stoichiometric air-to-fuel ratios. The stoichiometric air-to-fuel ratio for gasoline is approximately 14.64:1. That is to say, a stoichiometric mixture of gasoline and air comprises 14.64 parts air for every one part gasoline. Nevertheless, according to some embodiments, the pre-combustion fuel mixing device 100 is operated to vary the air-to-fuel ratio. In one embodiment, the pre-combustion fuel mixing device 100 automatically varies the air-to-fuel ratio between approximately 14.2:1 and 19:1. In some embodiments, the air-to-fuel ratio is varied between 12.0:1 and 21:1.

For example, Table 1 below may be programmed into the valve controllers and/or the fuel injector of the pre-combustion mixture device 100 to vary the air-to-fuel ratio based on the engine speed and load (as indicated by the intake manifold absolute pressure). The values in Table 1 represent a multiplier from stoichiometric for the air-to-fuel ratio. For example, a value of 0.97 in Table 1 represents an air-to-fuel ratio of 14.2:1 (14.64×0.97), while a value of 1.3 represents an air-to-fuel ratio of 19:1 (14.64×1.3).

TABLE 1

Air-to-Fuel ratio (as a function of stoichiometric) for various engine conditions

| Load (KPa$_{abs}$) | RPM | | | | | | | |
|---|---|---|---|---|---|---|---|---|
| | 200 | 1000 | 2000 | 3000 | 4000 | 5000 | 6000 | 7000 |
| 10 | 1.27 | 1.27 | 1.30 | 1.30 | 1.30 | 1.30 | 1.30 | 1.30 |
| 42 | 1.27 | 1.27 | 1.30 | 1.30 | 1.30 | 1.30 | 1.30 | 1.30 |
| 50 | 1.21 | 1.21 | 1.21 | 1.21 | 1.21 | 1.21 | 1.21 | 1.21 |
| 60 | 1.12 | 1.12 | 1.12 | 1.12 | 1.12 | 1.12 | 1.12 | 1.12 |
| 70 | 1.04 | 1.04 | 1.04 | 1.04 | 1.04 | 1.04 | 1.04 | 1.04 |
| 80 | 1.00 | 1.00 | 1.00 | 1.00 | 1.00 | 1.00 | 1.00 | 1.00 |
| 90 | 0.97 | 0.97 | 0.97 | 0.97 | 0.97 | 0.97 | 0.97 | 0.97 |
| 105 | 0.97 | 0.97 | 0.97 | 0.97 | 0.97 | 0.97 | 0.97 | 0.97 |

Those of ordinary skill in the art having the benefit of this disclosure will recognize that the values shown in Table 1 are exemplary in nature, and many other values may be used according to needs. Moreover, developing such a lookup table and/or generating a formula for air-to-fuel ratio variation might be complex and time-consuming, but would nevertheless be a routine undertaking for those of ordinary skill in the art having the benefit of this disclosure. However, as shown in Table 1, at reduced loads, which may include highway cruising conditions, the air-to-fuel ratio tends to be increased, in some conditions to well above stoichiometric. At higher loads, on the other hand, the air-to-fuel ratio may be decreased, sometimes below stoichiometric.

The preceding description has been presented only to illustrate and describe certain aspects, embodiments, and examples of the principles claimed below. It is not intended to be exhaustive or to limit the described principles to any precise form disclosed. Many modifications and variations are possible in light of the above teaching. Such modifications are contemplated by the inventor and within the scope of the claims. The scope of the principles described is defined by the following claims.

What is claimed is:

1. An apparatus, comprising:
   a pre-combustion fuel mixing device, the device comprising: a housing; a first pre-combustion vortex chamber enclosed by the housing;
   a plurality of angled passages leading into the first pre-combustion vortex chamber for creating a vortex;
   a first oxidant fluid flow path in fluid communication with the first pre-combustion vortex chamber;
   a second pre-combustion vortex chamber enclosed by the housing, the second pre-combustion vortex chamber being larger than the first pre-combustion vortex chamber;
   a plurality of angled passages leading into the second pre-combustion vortex chamber for creating a vortex;
   a second oxidant fluid flow path in fluid communication with the second pre-combustion vortex chamber;
   a throttle body housing a valve, wherein the valve controls fluid flow through the second oxidant fluid flow path and is mechanically connected to a fuel pedal.

2. An apparatus according to claim 1 wherein the angled passageways are non-tangential and non-radial relative to a surface of the pre-combustion vortex chamber into which the angled passageways are formed.

3. An apparatus according to claim 1, further comprising first and second diverging nozzles leading out of the first and second pre-combustion vortex chambers, respectively.

4. An apparatus according to claim 1, further comprising a first diverging nozzle leading out of the first pre-combustion vortex chamber, the first diverging nozzle comprising a plurality of passages angled opposite of the plurality of angled passages leading into the first pre-combustion vortex chamber.

5. An apparatus according to claim 1, further comprising a conical pillar adjacent to an outlet of the first and second pre-combustion vortex chambers.

6. An apparatus according to claim 1, further comprising a conical pillar adjacent to an outlet of the first and second pre-combustion vortex chambers, the conical pillar comprising a peripheral lip.

7. An apparatus according to claim 1, wherein the valve is disposed in the second oxidant fluid flow path, wherein the valve operates and opens a predetermined amount based on oxidant need.

8. An apparatus according to claim 1, further comprising a fuel injector aligned substantially axially with the first and second pre-combustion vortex chambers, the fuel injector comprising an axial flow channel, and a plurality of radial flow channels.

9. An apparatus according to claim 1, further comprising a fuel injector disposed in a cylindrical cavity of the housing and in fluid communication with the first and second pre-combustion vortex chambers, the fuel injector comprising a liquid flow channel and an atmospheric vent in fluid communication with liquid flow channel.

10. An apparatus according to claim 1 wherein the first pre-combustion vortex chamber is defined by a wheel, the wheel having the angled passages, wherein the angles of the angled passages are non-tangential, and non-radial relative to a surface of the wheel into which the angled passages are formed.

11. An apparatus according to claim 1 wherein the first pre-combustion vortex chamber is defined by a wheel, the wheel having the angled passages, wherein the angles of the angled passages are at least about thirty degrees from tangent of a surface of the wheel into which the angled passages are formed.

12. An apparatus according to claim 1 wherein:
   the first and second pre-combustion vortex chambers are defined by first and second wheels, the wheels having the angled passages;
   the second wheel comprises a radius at least twice as large as the first wheel;

the angles of the angled passages range between ten and seventy degrees from tangent of a surface of the wheel into which the angled passages are formed.

13. An apparatus, comprising:
an internal combustion engine premixing device, the device comprising:
a two stage vortex chamber, wherein a first stage is in fluid communication with a first oxidation source, and a second stage is in fluid communication with a separate, second oxidation source;
a fuel injector arranged axially internal of first and second stages;
A throttle body housing a valve, wherein the valve controls fluid flow through the second oxidant fluid flow path and is mechanically connected to a fuel pedal.

14. An apparatus according to claim 13 wherein the first stage, the second stage, and the fuel injector are substantially coaxial.

15. An apparatus according to claim 13 wherein:
the first stage comprises a high vacuum, low flow rate vortex chamber;
the second stage comprises a larger volume than the first stage and comprises a low vacuum, high flow rate vortex chamber.

16. An apparatus according to claim 13 wherein:
the first stage comprises a first wheel having angled passages for creating a vortex;
the second stage comprises a second wheel that is larger than the first wheel for creating a vortex.

17. An apparatus according to claim 13 further comprising a first nozzle disposed at an outlet to the first stage, the first nozzle comprising fluid passages arranged both in a vortex direction and an opposite of the vortex direction, for directing fluids pulverized by the first stage in a generally non-rotational flow.

18. An apparatus according to claim 13, further comprising a diverging nozzle at an outlet of the second stage.

19. An apparatus according to claim 13, further comprising a pillar arranged adjacent to the internal combustion engine premixing device for centering a vortex created in the first or second stages.

20. An apparatus according to claim 13 wherein the fuel injector comprises axial and radial ports for injecting fuel into the first and second stages.

21. An apparatus according to claim 13 wherein the device is infinitely adjustable between oxidant fluid flow directed to the first and second stages.

22. An apparatus according to claim 13 wherein the first oxidation source is open to the first stage until a predetermined flow rate is reached, and the second oxidation source is opened when the predetermined flow rate is reached.

23. An apparatus according to claim 13, further comprising a water jacket disposed about the first stage of the two stage vortex chamber.

24. An apparatus, comprising:
a fuel/air mixer, the fuel/air mixer comprising:
a housing;
an axially aligned vortex assembly, the vortex assembly comprising:
a hat comprising a cylindrical cavity;
a fuel injector disposed in the cylindrical cavity, the fuel injector comprising an axial fuel flow path and a plurality of radial fuel flow paths;
an annulus between the cylindrical cavity and the injector at the radial fuel flow paths;
a first vortex wheel arranged adjacent to the hat, the first vortex wheel comprising a plurality of angled passages spaced around a periphery of the first vortex wheel, the angled passages comprising an angle ranging between approximately five and fifty degrees from tangent of a surface of the first vortex wheel into which the angled passages are formed;
a first output nozzle comprising a rim, the rim contacting the first vortex wheel, the first output nozzle further comprising a primary central axis hole open to the center of the first vortex, and a plurality of angled passages extending through the nozzle at different angles, the different angles directing flow both clockwise and counterclockwise;
a restrictor plate spaced from the first output nozzle;
a second vortex wheel in contact with the restrictor plate, the second vortex wheel being larger than the first vortex wheel, the second vortex wheel comprising a plurality of angled passages spaced around a periphery of the second vortex wheel, the angled passages comprising an angle ranging between approximately five and fifty degrees from tangent of the surface of the second vortex wheel into which the angled passages of the second vortex wheel are formed;
a second output nozzle adjacent to the second vortex wheel and leading out of the housing.

25. An apparatus according to claim 24, further comprising:
a first oxidizer passageway disposed in the housing and in fluid communication with the first vortex wheel, the first oxidizer passageway comprising a first adjustable valve;
a second oxidizer passageway disposed in the housing and in fluid communication with the second vortex wheel.

26. An apparatus according to claim 24, further comprising:
a first oxidizer passageway disposed in the housing and in fluid communication with the first vortex wheel, the first oxidizer passageway comprising a first adjustable valve;
a second oxidizer passageway disposed in the housing and in fluid communication with the second vortex wheel;
wherein flow through the first or second oxidizer passageways is mutually exclusive.

27. An apparatus according to claim 24, wherein the housing further comprises a water jacket.

28. An apparatus according to claim 24, further comprising:
a first oxidizer passageway disposed in the housing and in fluid communication with the first vortex wheel, the first oxidizer passageway comprising a first electronically adjustable valve;
a second oxidizer passageway disposed in the housing and in fluid communication with the second vortex wheel, the second oxidizer passageway comprising a mechanically operated butterfly valve operatively connected a fuel pedal.

29. A method, comprising:
fueling an internal combustion engine, the fueling comprising:
creating a gaseous, homogenous premixture of fuel and oxidizer in a first pre-combustion vortex chamber, comprising:
providing a primary stage oxidizer introduction path;
providing a secondary stage oxidizer introduction path;
opening a valve in the secondary stage oxidizer introduction path upon reaching a predetermined oxidizer requirement threshold;

creating an oxidizer vortex in a second pre-combustion vortex chamber with fluid flow from the secondary stage oxidizer introduction path;
introducing fuel at an axis of the oxidizer vortex;
pulverizing the fuel and mixing the fuel with the oxidizer;
drawing the gaseous, homogenous premixture of fuel and oxidizer from the first pre-combustion vortex chamber into a combustion chamber.

30. A method, comprising:
fueling an internal combustion engine, the fueling comprising:
creating a gaseous, homogenous premixture of fuel and oxidizer in a first pre-combustion vortex chamber, comprising;
providing a primary stage oxidizer introduction path;
providing a secondary stage oxidizer introduction path;
opening a valve in the secondary stage oxidizer introduction path upon reaching a predetermined oxidizer requirement threshold and holding open a valve in the primary stage oxidizer introduction path;
creating an oxidizer vortex in a second pre-combustion vortex chamber with fluid flow from the secondary stage oxidizer introduction path;
introducing fuel at an axis of the oxidizer vortex;
pulverizing the fuel and mixing the fuel with the oxidizer;
drawing the gaseous, homogenous premixture of fuel and oxidizer from the first pre-combustion vortex chamber into a combustion chamber.

31. A method, comprising:
fueling an internal combustion engine, the fueling comprising:
creating a gaseous, homogenous premixture of fuel and oxidizer in a first pre-combustion vortex chamber, comprising;
providing a primary stage oxidizer introduction path;
providing a secondary stage oxidizer introduction path;
mechanically opening a throttle valve in the second stage oxidizer introduction path according to fuel pedal position;
creating an oxidizer vortex in a second pre-combustion vortex chamber with fluid flow from the secondary stage oxidizer introduction path;
introducing fuel at an axis of the oxidizer vortex;
pulverizing the fuel and mixing the fuel with the oxidizer;
drawing the gaseous, homogenous premixture of fuel and oxidizer from the first pre-combustion vortex chamber into a combustion chamber.

* * * * *